United States Patent [19]

Yoshii

[11] 4,294,076

[45] Oct. 13, 1981

[54] ABSORPTION REFRIGERATING SYSTEM

[75] Inventor: Kazuhiro Yoshii, Gunma, Japan

[73] Assignees: Sanyo Electric Co. Ltd., Moriguchi; Tokyo Sanyo Electric, Ora, both of Japan

[21] Appl. No.: 151,610

[22] Filed: May 20, 1980

[30] Foreign Application Priority Data

May 30, 1979 [JP] Japan .................................. 54-67630
Feb. 20, 1980 [JP] Japan .................................. 55-20979

[51] Int. Cl.³ ........................ F25B 27/00; F25B 15/00
[52] U.S. Cl. .................................... 62/235.1; 62/148; 62/238.3; 62/476; 62/497
[58] Field of Search ................. 62/148, 2, 238.3, 476, 62/497

[56] References Cited

U.S. PATENT DOCUMENTS

| | | | |
|---|---|---|---|
| 3,710,852 | 1/1973 | Porter | 62/476 |
| 4,028,078 | 6/1976 | Peckham | 62/2 |
| 4,085,595 | 4/1978 | Saito et al. | 62/497 X |
| 4,179,895 | 12/1979 | Shimokawa et al. | 62/476 X |
| 4,183,228 | 1/1980 | Saito et al. | 62/476 X |

*Primary Examiner*—Lloyd L. King
*Attorney, Agent, or Firm*—Darby & Darby

[57] ABSTRACT

The present application discloses an absorption refrigerating system which comprises a main generator constituted by a high temperature generator to evaporate and separate a refrigerant from an absorbent with a high temperature heat source being utilized as a heat source, and a low temperature generator to separate a refrigerant from the absorbent with the refrigerant evaporated at the high temperature generator being utilized as a heat source; an auxiliary generator to separate a refrigerant from the absorbent with a low temperature heat source being utilized as a heat source; a condenser; an evaporator; an absorber or the like; and in which said devices above-mentioned are connected by refrigerant lines and absorbent lines to form the circulation cycles of the refrigerant and the absorbent. In such an absorption refrigerating system, the auxiliary generator and the low temperature generator are separately housed in a common housing such that a same level pressure is applied to the auxiliary generator and the low temperature generator and such that the respective solutions in the auxiliary generator and the low temperature generator are not mixed with each other. There is disposed an absorbent line for connecting the absorber to the auxiliary generator and there is also disposed an absorbent pump at the absorbent line for connecting the auxiliary generator to the main generator.

4 Claims, 2 Drawing Figures

ABSORPTION REFRIGERATING SYSTEM

FIELD OF THE INVENTION

The present invention relates to an absorption refrigerating system constructed so as to use, selectively or in combination, a low temperature level heat source including hot water obtained by a solar heat collecting apparatus, warm water obtained by utilizing natural heat such as terrestrial heat and warm waste water from factories or/and a high temperature heat source including steam combustion gas or fossil fuel such as petroleum.

BACKGROUND OF THE INVENTION

An absorption refrigerating system utilizing hot water obtained by a solar heat collecting apparatus or warm water such as warm waste water as a heat source, has generally been widely applied, owing to low cost of such driving heat source.

However, as to such heat source of warm water, there is a disadvantageous case where the temperature of such warm water is too low or a sufficient heat value cannot always be obtained when required. Therefore, in order to operate such absorption refrigerating system dependent on the amount of load, a high temperature heat source utilizing steam, combustion gas or fossil fuel has generally been used in combination with a low temperature level heat source. When operating such absorption refrigerating system by using fossil fuel, it has been desired to perform a double-effect operation to enhance the operational efficiency.

On the other hand, when the absorption refrigerating system is operated only with a heat source of low temperature warm water, the temperature of such heat source is too low and subsequently it is difficult to perform a double-effect operation.

Therefore, it has generally been practised to select the operational mode of an absorption refrigerating system by a specially disposed selector valve such that a single-effect operation is performed when low temperature warm water is used as a driving heat source, and a double-effect operation is performed when a high temperature heat source using fossil fuel is used as a driving heat source. However, such provision of the selector valve is not preferable, because not only the switching operation of the selector valve is troublesome, but also the absorption refrigerating system becomes complicated in construction.

DISCLOSURE OF THE INVENTION

The present invention relates to an absorption refrigerating system which comprises a main generator constituted by a high temperature generator to evaporate and separate a refrigerant from an absorbent with steam, high temperature water, combustion gas or the like being utilized as a heat source, and a low temperature generator to separate a refrigerant from the absorbent with the refrigerant evaporated in the high temperature generator being utilized as a heat source; an auxiliary generator to separate a refrigerant from the absorbent with solar heat or low temperature warm water such as warm waste water being utilized as a heat source; a condenser; an evaporator; an absorber and others; and in which these devices above-mentioned are connected by refrigerant lines and absorbent lines to form the circulation cycles of the refrigerant and the absorbent. In such absorption refrigerating system, the auxiliary generator and the low temperature generator are separately housed in a common housing such that a same level pressure is applied to both the auxiliary generator and the low temperture generator and such that the respective absorbents in the auxiliary generator and the low temperature generator are not mixed with each other, and there is disposed an absorbent line for connecting the absorber to the auxiliary generator and there is also disposed an absorbent pump at the absorbent line for connecting the auxiliary generator to the main generator. With such arrangement, when a double-effect operation is performed with the low temperature generator operated, the absorbent pump is adapted to be operated, and when a single-effect operation is performed with the low temperature generator stopped operating, the absorbent pump is adapted to be stopped operating.

According to the absorption refrigerating system of the present invention, the selection of a single-effect operation or a double-effect operation may be performed without the use of a particular selector valve, whereby an efficient operation may be realized.

BRIEF DESCRIPTION OF THE DRAWINGS

The present invention will be further described by way of example, with reference to the accompanying drawings in which.

DETAILED DESCRIPTION OF THE PREFERRED EMBODIMENTS

The description will first be made of a first embodiment of an absorption refrigerating system of the present invention, with reference to FIG. 1.

Figure 1:
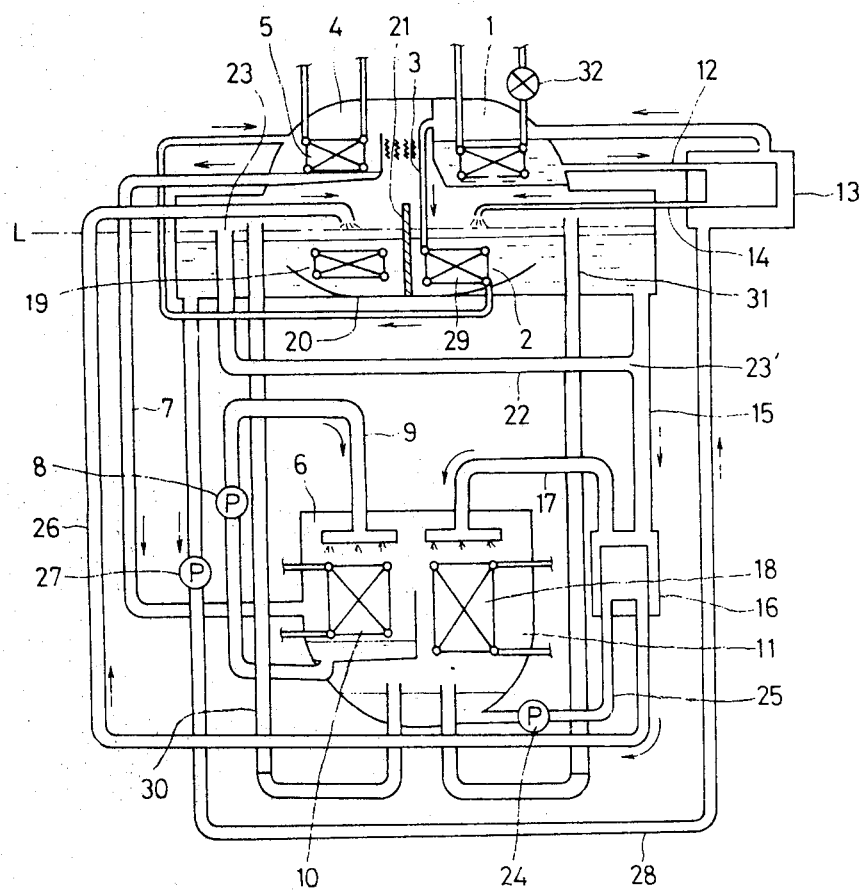
FIG. 1 is a schematic block diagram of a first embodiment of an absorption refrigerating system in accordance with the present invention.

In FIG. 1, a high temperature generator 1 is to be heated by a high temperature heat source of steam, combustion gas or fossil fuel such as petroleum and to be adapted to heat an absorbent to separate a refrigerant therefrom.

A low temperature generator 2 is adapted to heat a medium solution concentrated in the high temperature generator 1 under a pressure lower than that in the high temperature generator 1, with the refrigerant vapor supplied from the high temperature generator 1 through a refrigerant vapor line 3 being utilized as a heat source. The medium solution is further heated to separate a refrigerant therefrom and is subsequently concentrated.

A condenser 4 is adapted to condense and cool a flowing refrigerant by means of cooling means 5 in which cooling water for condensing a refrigerant is adapted to flow.

There is disposed an evaporator 6, and a refrigerant liquid from the condenser 4 is adapted to be sent to and sprayed in this evaporator 6 through a refrigerant downstream line 7, a refrigerant pump 8 and a refrigerant circulation line 9. By utilizing latent heat produced when this refrigerant liquid is evaporated, brine in cooling means 10 is cooled so that chilled water for cooling load externally disposed may be obtained.

There is disposed an absorber 11, and a dense solution formed with a refrigerant separated from the dilute solution in the high temperature generator 1 is adapted to be sent to and sprayed in this absorber 11 through an absorbent line 12, a second heat exchanger 13, an absorbent line 14, a low temperature generator 2, a dense solution line 15, a first heat exchanger 16 and a dense solution line 17. Reaction heat is then exhausted by cooling means 18 and refrigerant vapor in the absorber 11 is absorbed. Thus, the inside of the evaporator 6 is maintained at a low pressure, thereby to provide a continuous supply of chilled water from the water cooling means 10 in the evaporator 6.

There is disposed an auxiliary generator 19, and as a heat source of this auxiliary generator 19, there is utilized hot water obtained from a solar heat collecting apparatus, warm water obtained by utilizing natural heat such as terrestrial heat or low temperature warm water such as warm waste water from factories.

A housing 20 has a partition plate 21 for partitioning the auxiliary generator 19 from the low temperature generator 2 such that the respective solutions in the generators 19 and 2 are not mixed with each other and a same level pressure is applied to the generators 19 and 2.

A lateral line 22 is disposed to connect the auxiliary generator 19 to the absorber 11. The inlet end 23 of this lateral line 22 is opened at a position L slightly higher than the level of a solution in the auxiliary generator 19 at the time when the high temperature generator 1 and the low temperature generator 2 are being operated. The outlet end 23' of the lateral line 22 is connected to the dense solution line 15.

When a high temperature heat source by fossil fuel is merely used, or the low temperature generator 2 is operated with a high temperature heat source used in combination with a low temperature heat source, the lateral line 22 is sealed with an absorbent, thereby to prevent the auxiliary generator 19 from being communicated with the absorber 11. Accordingly, the absorption refrigerating system is operated only with the auxiliary generator 19 to be heated by a heat source of low temperature warm water.

When the low temperature generator 2 is stopped operating, the absorbent concentrated at the auxiliary generator 19 is supplied directly to the absorber 11 through the lateral line 22.

There is disposed a first absorbent pump 24 and a dilute solution in the absorber 11 is adapted to be sent to the auxiliary generator 19 through this first absorbent pump 24, a dilute solution line 25, the first heat exchanger 16 and a dilute solution line 26. In the auxiliary generator 19, the dilute solution is then heated to evaporate and separate a refrigerant therefrom.

There is disposed a second absorbent pump 27 and a dilute solution slightly concentrated in the auxiliary generator 19 is adapted to be sent to the high temperature generator 1 through this second absorbent pump 27, a dilute solution line 28 and the second heat exchanger 13. In the high temperature generator 1, the dilute solution is then heated to evaporate and separate a refrigerant therefrom.

Adapted to be cooled and condensed in the condenser 4 are refrigerant gases to be flowed directly from the low temperature generator 2 and the auxiliary generator 19, and a refrigerant to be flowed from the high temperature generator 1 through heating means 29 of the low temperature generator 2.

There is disposed an overflow line 30. When an amount of an absorbent in the auxiliary generator 19 exceeds a predetermined amount, such exceeded absorbent is adapted to be flowed to the absorber 11 through this overflow line 30. There is also disposed an overflow line 31 at the side of the low temperature generator 2. At the normal operation, these overflow lines 30 and 31 are sealed with the absorbent.

The description hereinafter will discuss the operation of the embodiment shown in FIG. 1.

When a double-effect operation is performed by using both a high temperature heat source to be heated by fossil fuel and a low temperature warm water heat source or by using only a high temperature heat source to be heated fossil fuel, both the first and second absorbent pumps 24 and 27 are operated and the levels of the absorbent and the refrigerant are substantially at the levels shown in FIG. 1.

The dilute solution from the absorber 11 is firstly sent to the auxiliary generator 19 through the first heat exchanger 16 by the first absorbent pump 24. After a portion of a refrigerant has been separated from the dilute solution in the auxiliary generator 19, the dilute solution is sent to the high temperature generator 1 and the low temperature generator 2 through the second heat exchanger 13 by the second absorbent pump 27. A refrigerant is further separated from the dilute solution, which then becomes a dense solution. Thus formed dense solution is again sent to and sprayed in the absorber 11 through the first heat exchanger 16.

The refrigerants separated in the auxiliary generator 19, the high temperature generator 1 and the low temperature generator 2 are condensed in the condenser 4 and then cool brine within the water cooling means 10 in the evaporator 6, thereby to supply chilled water to cooling load which is externally disposed.

On the other hand, the evaporated refrigerant is absorbed into the absorbent in the absorber 11 and then returned again to the auxiliary generator 19. Thereafter, such cycle is repeated to perform a double-effect operation.

The absorption refrigerating system may be operated only with the auxiliary generator 19 to be heated by a low temperature warm water heat source when such low temperature warm water heat source is sufficiently obtained or when load is relatively small and subsequently fossil fuel is not particularly required. In such a case, the second absorbent pump 27 is stopped operating and the first absorbent pump 24 is merely operated. Accordingly, no solution is flowed to the main generator side and therefore the levels of solutions in the auxiliary generator 19 and the low temperature generator 2 are raised up to the level L shown in FIG. 1. The absorbent of which refrigerant is separated in the auxiliary generator 19, is flowed into the lateral line 22 through the inlet end 23 and is sprayed in the absorber 11, thus performing a single-effect operation.

At this time, the level of a solution in the low temperature generator 2 becomes same as the level of a solution in the auxiliary generator 19. However, since second absorbent pump 27 is stopped operating and subsequently the absorbent does not flow from the high temperature generator 1, no absorbent flows down from the low temperature generator 2. Therefore, the absorbents in the high temperature generator 1 and the low temperature generator 2 are not circulated.

In the double-effect operation above-mentioned, when cooling load becomes small, a control valve 32 may be closed to reduce the amount to be heated at the high temperature generator 1. When the control valve 32 is thus closed, the pressure in the high temperature generator 1 is decreased and the flowing amount of an absorbent to the low temperature generator 2 is relatively small as compared with the flowing amount of an absorbent from the second absorbent pump 27. Then, the second absorbent pump 27 is stopped operating by solution level relay means (not shown) of the high temperature generator 1. Also in the case of such partial load, the level of a solution in the auxiliary generator 19 is raised up to the level L. Therefore, similarly to the operation to be performed only with a heat source of low temperature warm water, a double-effect operation is switched to a single-effect operation in which the absorbent is sprayed after having passed through the lateral line 22, thereby to assure air-cooling effect dependent on partial load.

The overflow lines 30 and 31 are disposed for flowing absorbents in the auxiliary generator 19 and the low temperature generator 2 down to the absorber 11, when the levels of such absorbents are extraordinarily raised up, due to slow flowing of an absorbent in the dense solution line 15 or trouble in the first absorbent pump 24. While such overflow lines are disposed for both generators 19 and 2 in the embodiment above-mentioned, a similar function may be obtained also in the arrangement of such overflow line disposed only for either generator.

As thus discussed hereinbefore, according to the absorption refrigerating system of a double-effect operation having the auxiliary generator of the present invention, the auxiliary generator and the low temperature generator are separately housed in the housing such that a same level pressure is applied to the both generators and respective solutions in the both generators are not mixed with others; and there is disposed the absorbent line to connect the absorber to the auxiliary generator; and there is also disposed the absorbent pump in the absorbent line to connect the auxiliary generator to the main generator. With such arrangement, when a double-effect operation is performed with the low temperature generator operated, the absorbent pump is operated, and when a single-effect operation is performed with the low temperature generator stopped operating, the absorbent pump is stopped operating. Thus, the selection of a single-effect operation or a double-effect operation may be automatically performed dependent on the operational status of the respective generators, without operating a specially disposed selector valve as conventionally done. Thus, the absorption refrigerating system in accordance with the present invention is more effective in view of simplified construction, convenient control and preservation of higher air-tightness in the circulation cycles of absorbents and refrigerants, as compared with a conventional absorption refrigerating system in which a selector valve has been used.

The description hereinafter will discuss a second embodiment of the absorption refrigerating system in accordance with the present invention.

Figure 2:
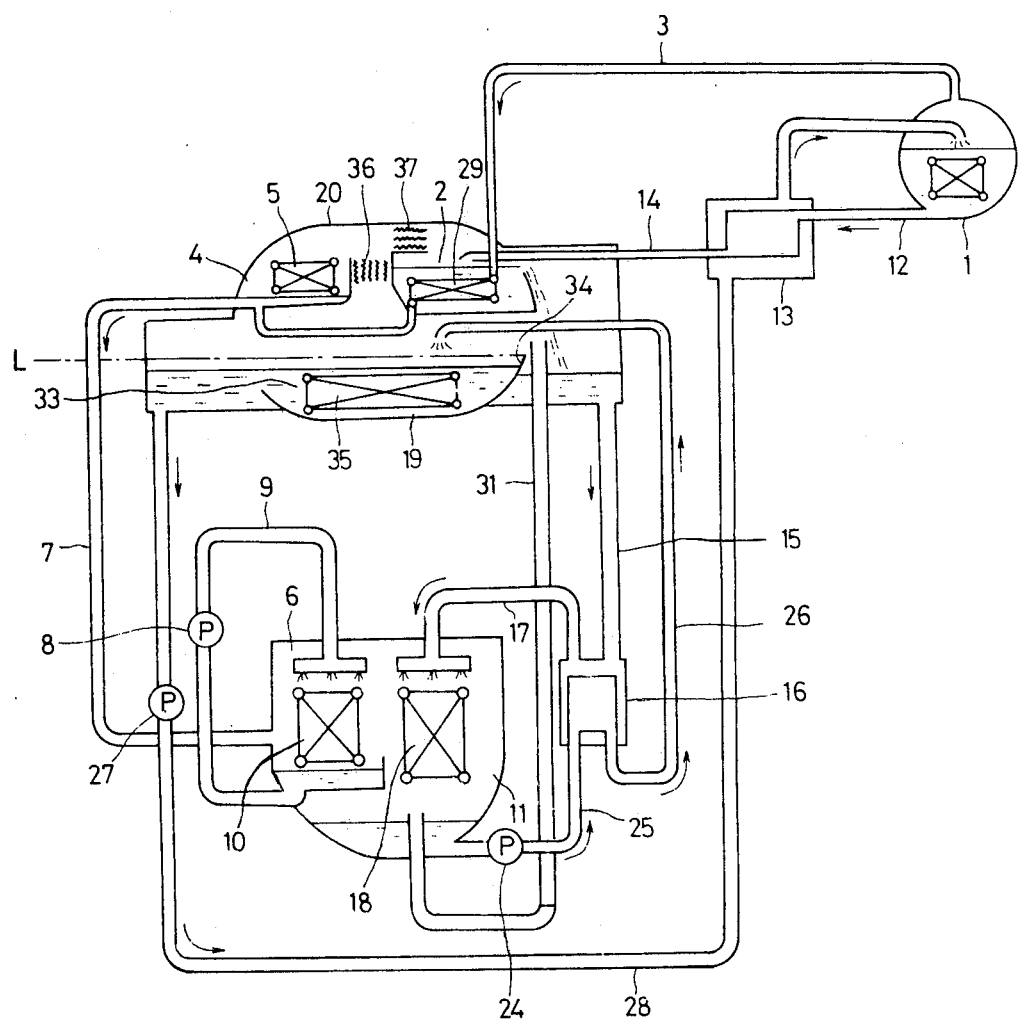
FIG. 2 is a schematic block diagram of a second embodiment of an absorption refrigerating system in accordance with the present invention.

It is to be noted that in FIG. 2 like parts are designated by like numerals used in FIG. 1.

Similarly to the first embodiment shown in FIG. 1, an auxiliary generator 19, a low temperature generator 2 and a condenser 4 are housed in a common housing 20, but they are vertically arranged in the second embodiment.

The auxiliary generator 19 is disposed under the condenser 4 and the low temperature generator 2 and comprises a dam means 34 to form a dilute solution reservoir 33 having a shallow depth covering the substantially entire surface of the bottom of the housing 20, and a heating means 35 capable of heating a solution in the dilute solution reservoir 33 in a wide range thereof.

The low temperature generator 2 is disposed so as to oppositely face to the condenser 4 at the upper portion of the housing 20, and the low temperature generator 2 and the auxiliary generator 19 are connected to an absorber 11 by a common dense solution line 15.

Eliminators 36 and 37 are adapted to prevent an absorbent from flowing into the condenser 4 together with an evaporated refrigerant.

The description will then be made of the running operation in the second embodiment shown in FIG. 2.

The operation in the second embodiment is performed in cycles substantially same as those in the first embodiment shown in FIG. 1, in both cases of a single-effect operation and a double-effect operation, and the selection of a single-effect operation or a double-effect operation is automatically performed as done in the first embodiment. However, since the auxiliary generator 19 housed in the housing 20 is located under the lower generator 2 and the condenser 4 as mentioned earlier, it is possible to form the auxiliary generator 19 provided with a broader refrigerant evaporation area and a solution reservoir having a shallow depth to permit such solution to be easily boiled. Therefore, even though the temperature of the heat source of the heating means 35 is relatively low, a refrigerant may efficiently be separated from an absorbent in the auxiliary generator 19.

Furthermore, since the auxiliary generator 19 and the low temperature generator 2 are housed in the common housing 20 and are connected to the absorber 11 by the common dense solution line 15, it is possible to assure independently the respective functions of the low temperature generator 2 and the auxiliary generator 19 without the use of lines for respectively connecting the auxiliary generator 19 and the low temperature generator 2 to the dense absorbent line 15.

Moreover, an overflow line 31 may also be commonly used for the auxiliary generator 19 and the low temperature generator 2.

Thus, according to the second embodiment of the present invention, there may be provided an absorption refrigerating system of the type where a high temperature heat source is to be combinedly used, in which the construction is more simplified and the low temperature heat source may be utilized more efficiently than the first embodiment in FIG. 1.

INDUSTRIAL UTILITY

According to the absorption refrigerating system of the present invention, the selection of a single-effect operation or a double-effect operation may be performed by operating or stopping the operation of the absorbent pump, without the operation of a specially disposed selector valve, thereby to facilitate such selection operation and to maintain higher air-tightness in the circulation cycles.

Furthermore, the improvement in the arrangement of the auxiliary generator to be heated by a low temperature heat source and the high temperature generator to be heated by a high temperature heat source, permits to improve the function of refrigerant separation in the auxiliary generator.

What we claim is:

1. In an absorption refrigerating system which comprises a main generator constituted by a high temperature generator to evaporate and separate a refrigerant from an absorbent with vapor, high temperature water, combustion gas or the like being utilized as a heat source, and a low temperature generator to separate a refrigerant from the absorbent with the refrigerant evaporated in said high temperature generator being utilized as a heat source; an auxiliary generator to separate a refrigerant from the absorbent with solar heat or low temperature level warm water such as warm waste water being utilized as a heat source; a condenser; an evaporator; an absorber or others; and in which said devices above-mentioned are connected by refrigerant lines and absorbent lines to form the circulation cycles of the refrigerant and the absorbent, the improvements characterized in that said auxiliary generator and said low temperature generator are separately housed in a common housing such that a same level pressure is applied to said auxiliary generator and said low temperature generator and such that the absorbents in said auxiliary generator and said low temperature generator are not mixed with each other, and in that there is disposed an absorbent line for connecting said absorber to said auxiliary generator and there is also disposed an absorbent pump at the absorbent line for connecting said auxiliary generator to said main generator, whereby when a double-effect operation is performed with said low temperature generator operated, said absorbent pump is adapted to be operated, and when a single-effect operation is performed with said low temperature generator stopped operating, said absorbent pump is adapted to be stopped operating.

2. An absorption refrigerating system as set forth in claim 1, further comprising a lateral line, which is adapted to be sealed with the absorbent during the time a double-effect operation is performed, and through which the absorbent concentrated in said auxiliary generator is adapted to be supplied directly to the absorber during the time a single-effect operation is performed.

3. An absorption refrigerating system as set forth in claim 1, wherein the low temperature generator, the auxiliary generator and the condenser are partitioningly housed in a common housing, and said auxiliary generator is located under said condenser and said low temperature generator.

4. An absorption refrigerating system as set forth in claim 1, wherein the low temperature generator and the auxiliary generator are connected to the absorber by a common dense solution line.

* * * * *